United States Patent [19]
Nichols

[11] Patent Number: 5,971,410
[45] Date of Patent: Oct. 26, 1999

[54] LEAF TRANSPORTATION CADDY

[76] Inventor: George Nichols, P.O. Box 691, Canton, Miss. 39046

[21] Appl. No.: 08/964,007

[22] Filed: Nov. 4, 1997

[51] Int. Cl.[6] .......................................................... B62B 1/18
[52] U.S. Cl. .................................. 280/47.31; 280/47.315; 280/47.32; 280/47.33
[58] Field of Search ............................ 280/47.31, 47.315, 280/47.32, 47.33; 298/3

[56] References Cited

U.S. PATENT DOCUMENTS

| | | |
|---|---|---|
| 2,026,310 | 12/1935 | Gulliver . |
| 2,240,585 | 1/1941 | Taylor ........................................ 298/3 |
| 2,606,771 | 8/1952 | Rehnberg ................................... 280/42 |
| 4,629,203 | 12/1986 | Ballard . |
| 4,921,305 | 5/1990 | Steer . |
| 4,957,306 | 9/1990 | Greenberg . |
| 5,433,462 | 7/1995 | Groleau ..................................... 280/38 |

*Primary Examiner*—Christopher P. Ellis
*Assistant Examiner*—Kevin M. McKinley
*Attorney, Agent, or Firm*—Harpman & Harpman

[57] ABSTRACT

A leaf carrying cart having a contoured receiving body supported by a pair of spaced parallel arms that converge at a single wheel assembly. The receiving body is defined by a trough in which leaves can be directly raked. The arms extend beyond the receiving body to act as both transportation handles and with deployable ground engagement stakes as anchors for the cart when in use.

4 Claims, 4 Drawing Sheets

LEAF TRANSPORTATION CADDY

BACKGROUND OF THE INVENTION

1. Technical Field

This device relates to leaf and yard debris collection and transportation carts and the like which are used to collect and transport leaves from one location to another. The carts facilitate the collection of leaves so that their contents can be transferred into other disbursing conveyances, such as disposable bags.

2. Description of Prior Art

Prior art devices of this type have relied on a variety of wheel carts that are used to transport bulk material, such as leaves, garden debris or even snow. Typically, such carts have a pair of spaced wheels with a collection body positioned therebetween and some sort of hinged system to allow the cart in some instances to be lowered to the ground or elevated for dumping, see for example U.S. Pat. Nos. 2,026,310, 4,629,203, 4,921,305 and 4,957,306.

In U.S. Pat. No. 2,026,310 a shoveling hand cart is disclosed wherein a receptacle is pivotally secured to handles on a wheeled frame. A second set of handles extends directly from the receptacle which allows for tipping of the receptacle for loading and dumping.

U.S. Pat. No. 4,629,203 is directed towards a yard caddy comprising a cart supported by a pair of wheels with an extended handle. The cart can be pivoted on its wheels for ground engagement and then elevated for transportation by manual input to the handle.

U.S. Pat. No. 4,921,305 claims a wheelbarrow having a pair of support and transportation wheels with a bin positioned on a frame pivoted thereto. A contoured handle assembly is provided having cam shaped ground engaging portions that allow the bin to be lowered to the ground for ease of loading.

Finally, U.S. Pat. No. 4,957,306 illustrates a leaf wagon having a rectangular frame with a pair of hinge baskets thereon. One of the baskets has an open end for ease of loading and can be pivoted up over the remaining basket when not in use. A gated opening is positioned in the bottom of the first basket to aid in unloading bulk granulated type material.

SUMMARY OF THE INVENTION

A hand cart useful for the collection and carrying of large volumes of leaves or other bulky material. The cart allows for the direct raking of leaves therein when it is in a "at rest" position. A single wheel with attached support handles allows for lifting and transportation over uneven terrain. A receiving body bin is contoured to form a dumping chute to facilitate direct load transfer into disposable bags and the like when tipped into a near vertical position by pivoting the handles on its support wheel. Retaining anchors are provided to hold the cart in loading position and are deployable from the ends of the respective handles.

DESCRIPTION OF THE PREFERRED EMBODIMENT

Figure 1:
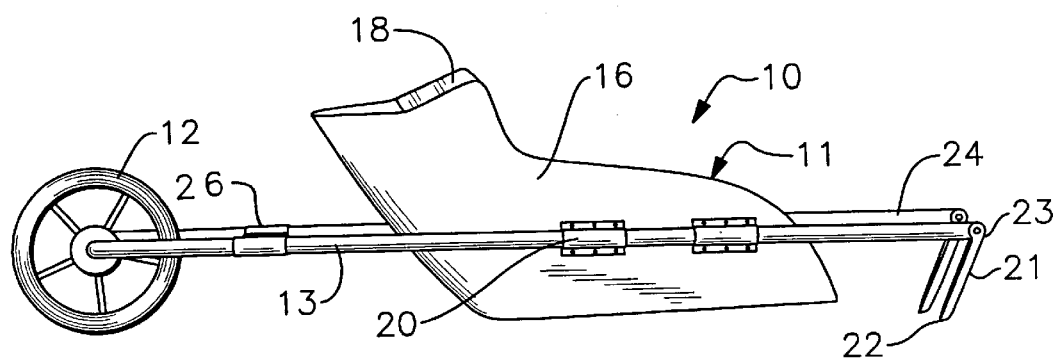
FIG. 1 is a side elevational view of the leaf collection and transportation cart of the invention.
Figure 2:
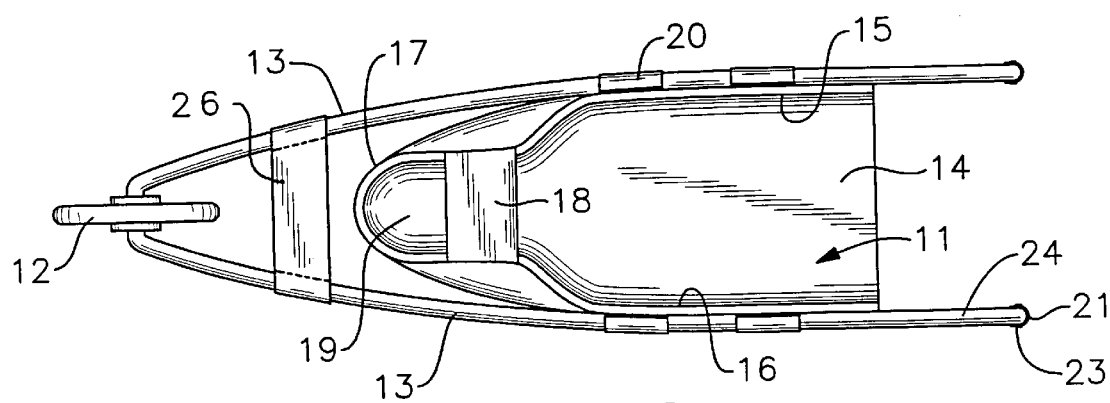
FIG. 2 is a top plan view of the collection cart illustrated in FIG. 1.
Figure 3:
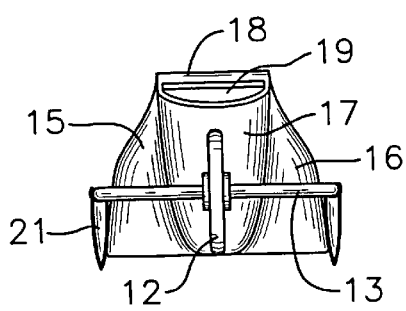
FIG. 3 is a front elevational view of the leaf collection cart of the invention.
Figure 4:
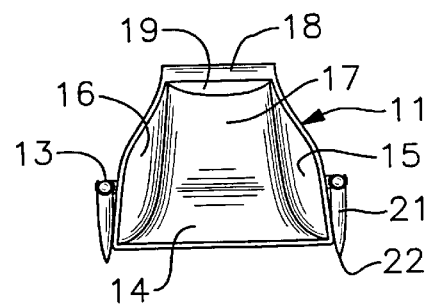
FIG. 4 is a rear elevational view of the leaf collection cart of the invention.

A leaf collection and transportation cart 10 can be seen in FIGS. 1–4 of the drawings having a contoured collection bin 11 with a single ground engaging wheel 12 pivoted to a pair of support handles 13 secured to the collection bin 11. The collection bin 11 has a wide flat bottom 14 with a pair of oppositely disposed upstanding sidewalls 15 and 16 extending therefrom. Sidewalls 15 and 16 are contoured towards one another defining an integral discharge spout portion 17 therebetween at one end of the collection bin as they advance forward of the bottom 11. A guide element 18 extends transversely between the sidewalls 15 and 16 at the top of the discharge spout portion 17 which defines a discharge opening at 19 for the collection bin 11. The spaced sidewalls 15 and 16 are tapered downwardly from the discharge spout portion 17 to the flat bottom 14 which in combination therewith defines a wide access and load opening opposite the discharge spout portion 17. The support handles 13 extend from the single support wheel 12 along the outer surface of the respective sidewalls 15 and 16 secured thereto by a pairs of mounting plates 20 respectively. The handles 13 extend beyond the sidewalls 15 and 16 each having a ground spike 21 extending therefrom. The ground spike 21, best seen in FIGS. 8 and 9 of the drawings, is transversely contoured and tapered from its respective oppositely disposed ends at 22 to apertured support pivot ends 23 that is pivotally secured to the respective free ends of the handles 13.

The spike 21 conforms with the outside dimension of the respective handles 13 so that when folded thereagainst the ground spike 21 defines a relatively smooth handle engagement portions at 24 as will be well understood by those skilled in the art. The ground spikes 21 are preferably made of metal and upon deployment from the respective handle engagement portions 24 are engageable with the ground G stabilizing the leaf collection and transportation cart 10 of the invention in its at rest position that allows for easy access of debris through the hereinbefore described access and loading opening at 19, best seen in FIG. 6 of the drawings.

Figure 5:
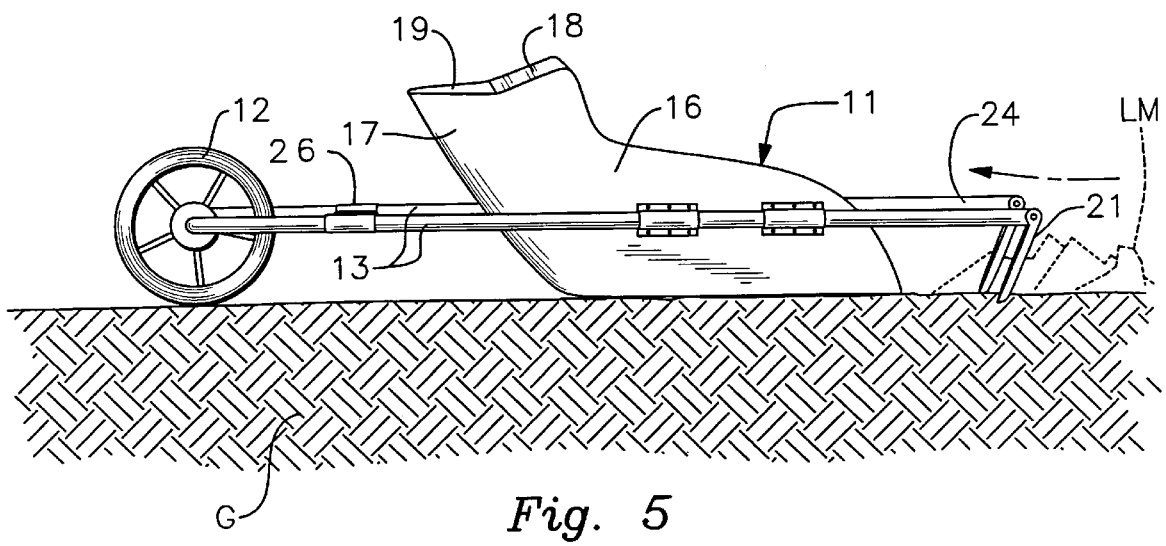
FIG. 5 is a side elevational view of the leaf cart of the invention positioned on the ground for loading.
Figure 6:
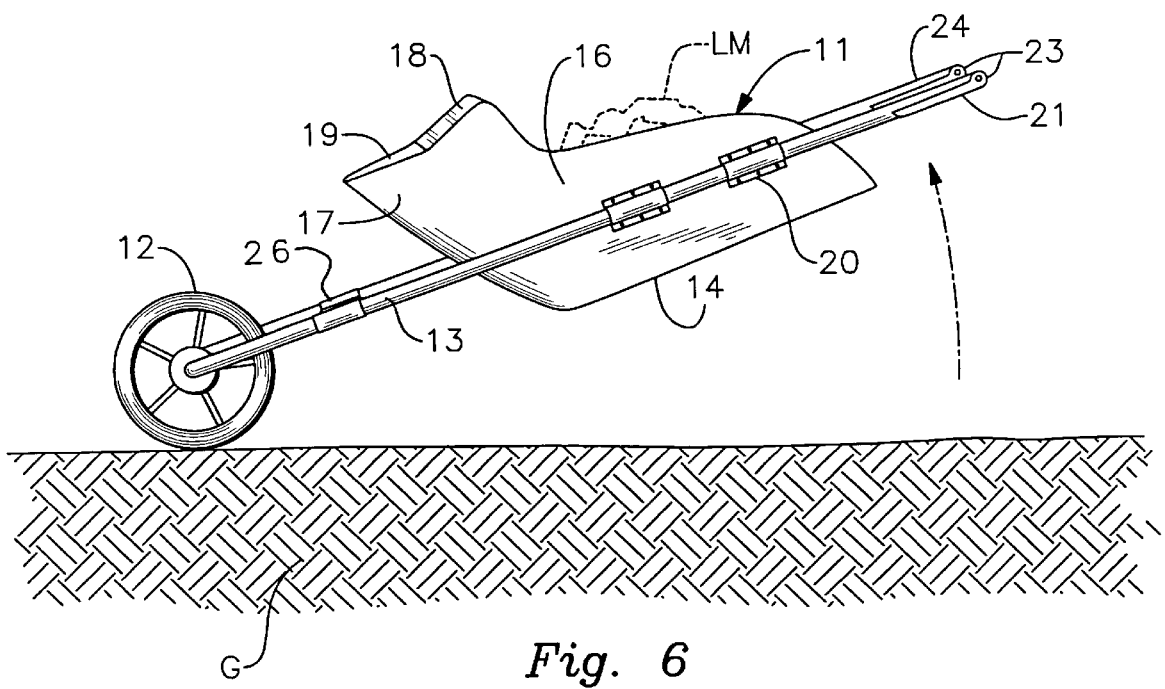
FIG. 6 is a side elevational view of the invention in loaded status.
Figure 7:
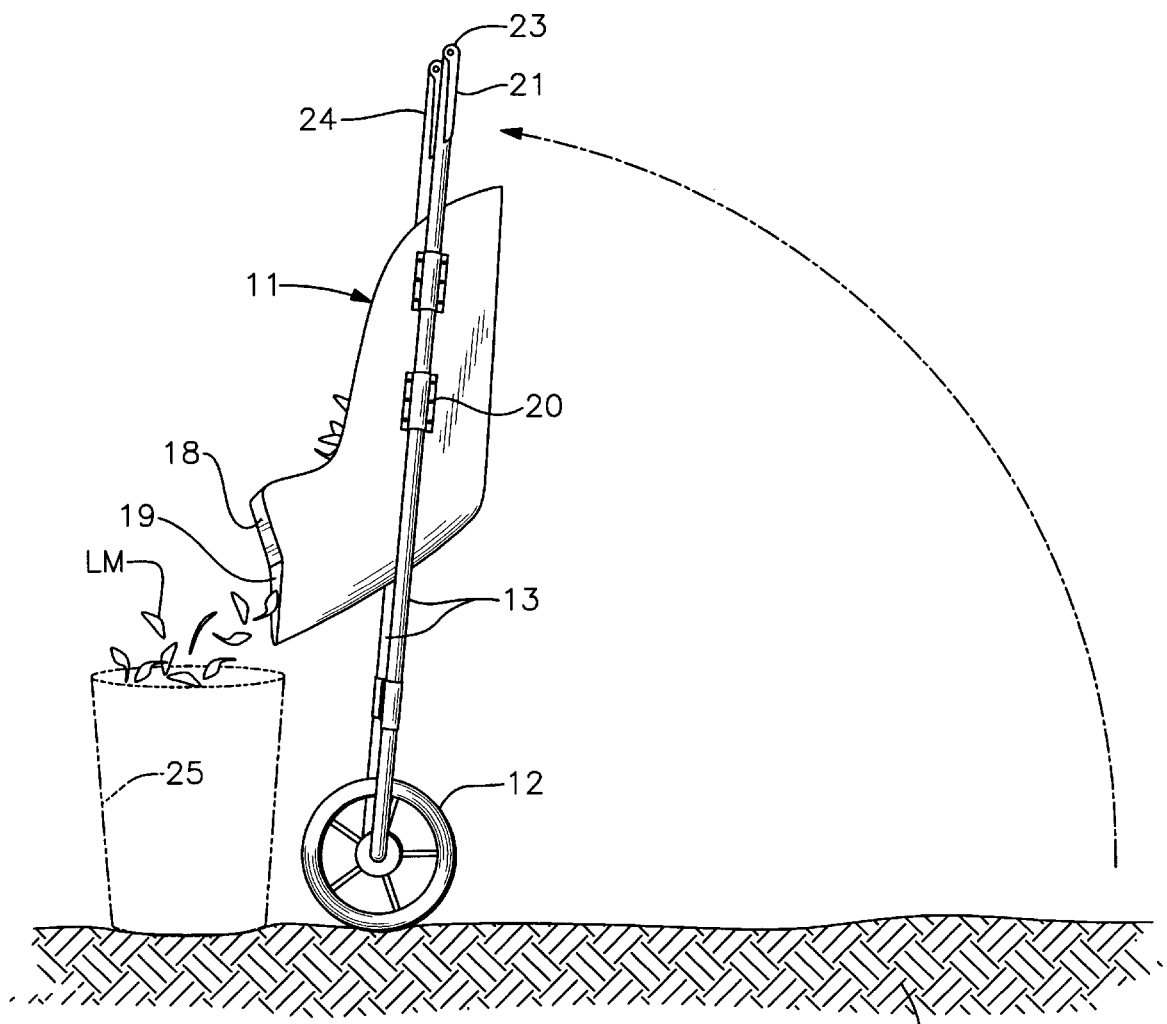
FIG. 7 is a side elevational view of the invention in dumping position.

Referring now to FIGS. 5–7 of the drawings, the leaf gathering and transportation and dumping actions of the cart of the invention 10 can be seen. Specifically, FIG. 5 illustrates the cart 10 "at rest" on the ground G with the ground engaging spikes 21 in contact with the ground G. Leaf material LM can now be raked or other wise moved into the collection bin 11 as defined by the flat bottom 14.

Figure 8:
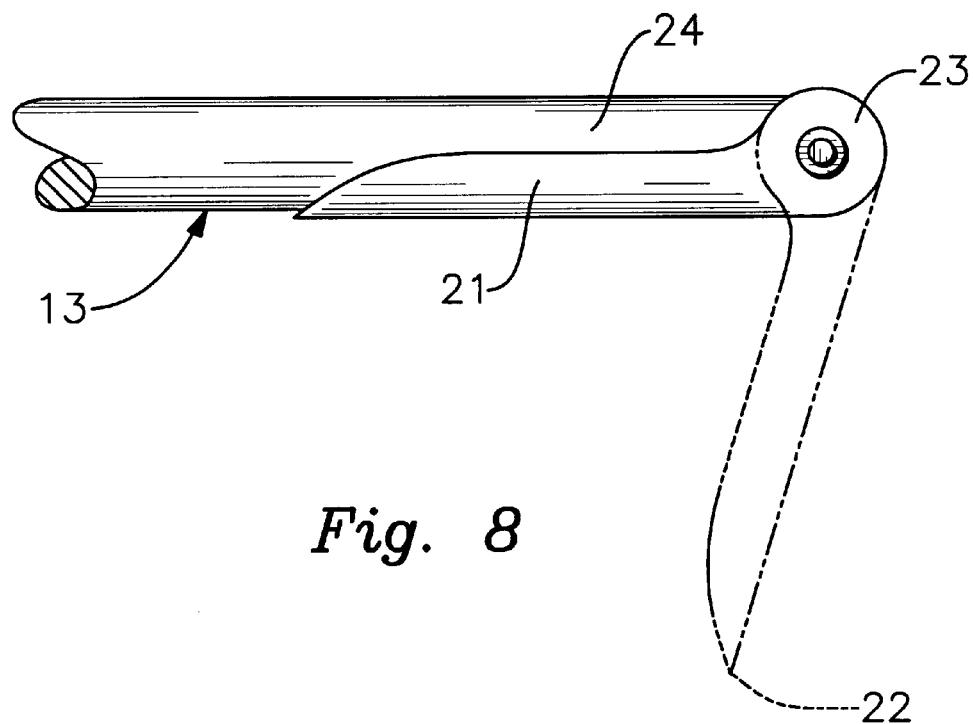
FIG. 8 is an enlarged partial side elevational view of a handle engagement portion of the cart illustrating ground engagement spikes deployable therefrom.
Figure 9:
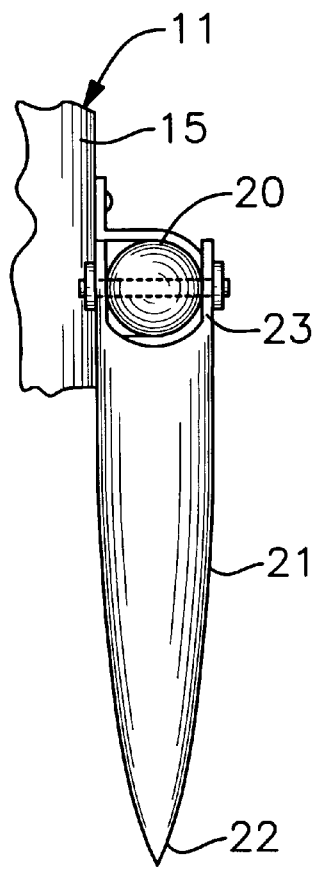
FIG. 9 is an enlarged end plan view of a portion of the handle of a cart with its deployable ground engagement spike in deployed position.

FIG. 6 of the drawing illustrates the transportation mode of the invention in which the ground engagement spikes 21 are disengaged and folded up against the respective handle engagement portions 24 of the handles 13 as illustrated specifically in FIGS. 8 and 9 of the drawings as hereinbefore described.

Referring now to FIG. 7 of the drawings, the cart 10 of the invention can be seen in an unloading dumping position characterized by the extreme near vertical orientation of the handles 13 and corresponding collection bin 11 whereupon the contents of the collection bin 11 (ML) is dispensed through the spout opening 19 into a disposable bag 25 shown in broken lines in this example.

It will be apparent that the guide element 18 on the collection bin 11 that interconnects the sidewalls 15 and 16 helps channel and guide the contents of the collection bin 11 within the discharging spout 17. Typically the interior surface of the bin 11 and collection spout and sidewalls are coated with a low friction co-efficient material for formed from a material having a low surface friction ration as will be understood by those skilled in the art, thus ensuring a clog-free dispensing of the material therethrough into the container of choice which as noted in this example is a disposable bag 25.

It will further be evident from the above description that the distance of the wheel 12 from the collection bin 11 is critical to the dischargeability of the invention in that it effectively spaces the collection bin 11 and associated discharge spout 17 at a distance above the ground G during dumping to allow for the placement of a container such as the disposable bag 25 therein under to receive the contents of same. A brace 26 extends between the handle 13 adjacent the wheel 12 for additional support.

It will seen from the above description that because the pivot point of the handles 13 with the support wheel 12 and the attachment point of the collection bin 11 that the handles 13 will be in relatively close proximity to the ground G so that the effective length of the hereinbefore described ground spikes 21 will allow ease of ground engagement to stabilize the leaf and collection transportation cart 10 of the invention for use without effectively interfering with users access thereto.

It will be thus be seen that a new and useful leaf collection and transportation cart has been illustrated and described and it will be apparent to those skilled in the art that various changes and modifications may be made therein without departing from the spirit of the invention.

Therefore I claim:

1. A hand cart conveyance comprising; a contoured bin for receiving and transportation of a load of bulk materials, a ground engaging wheel positioned in spaced relation to a front end of said collection bin, a pair of handles extending along respective sidewalls of said collection bin, said handles having a hand engageable end and a wheel engageable end, said handles pivotally connected to said engagement wheel at their respective wheel engagement ends, a discharge spout on the front end of said collection bin and a flat bottom portion between said sidewalls of said collection bin, said discharge spout having a guide element extending between said sidewalls in spaced relation to said flat bottom that defines a discharge opening therebetween, ground engagement means on said hand engageable ends of said handles, said handles secured to said sidewalls in spaced parallel relation to said flat bottom of said collection bin, said handles and said bin being movable from a first position, in which said collection bin is engageable with said ground, to a second position in which said handles and said collection bin are in spaced relation to said ground at an elevated angle thereto to facilitate dumping therefrom, said sidewalls and said flat bottom of said collection bin define a ground engaging access opening in said collection bin between said handles.

2. The hand cart conveyance set forth in claim 1 wherein said discharge spout is formed from said sidewalls.

3. The hand cart conveyance set forth in claim 1 wherein said ground engagement means comprises; spikes pivotally secured to the ends of said handle engagement portion of said handles.

4. The hand cart conveyance set forth in claim 3 wherein said spikes are transversely curved for registering against said hand engageable ends.

* * * * *